Dec. 25, 1962 H. I. STANBACK 3,070,679

FUSIBLE LOAD CENTER

Filed May 28, 1959 4 Sheets-Sheet 1

INVENTOR.

Harris L. Stanback

BY

Clyde H. Haynes attorney

Dec. 25, 1962 H. I. STANBACK 3,070,679

FUSIBLE LOAD CENTER

Filed May 28, 1959 4 Sheets-Sheet 2

INVENTOR.

Harris I. Stanback

BY

Clyde H Haynes attny

Dec. 25, 1962 H. I. STANBACK 3,070,679

FUSIBLE LOAD CENTER

Filed May 28, 1959 4 Sheets-Sheet 3

INVENTOR.

Harris I. Stanback

BY Clyde H Haynes atty.

Dec. 25, 1962 H. I. STANBACK 3,070,679

FUSIBLE LOAD CENTER

Filed May 28, 1959 4 Sheets-Sheet 4

INVENTOR.

BY

United States Patent Office 3,070,679
Patented Dec. 25, 1962

3,070,679

FUSIBLE LOAD CENTER

Harris I. Stanback, Birmingham, Mich., assignor to Square D Company, Detroit, Mich., a corporation of Michigan Filed May 28, 1959, Ser. No. 816,497
14 Claims. (Cl. 200—133)

This invention relates to a load center structure providing at least one trunk circuit and a plurality of parallel branch circuits and more particularly to structure wherein fuse blocks may be easily mechanically clipped onto existing branch circuit fuse blocks and electrically clipped onto trunk circuits to provide additional branch circuits paralleling the already existing branch circuits.

Load centers are generally constructed with one or more trunk circuits and a plurality of individual parallel fused branch circuits energized from the trunk circuit or circuits. The main disconnect has one side thereof connected to incoming power lines and the other side thereof connected to the branch circuits so that opening of the main disconnect kills or deenergizes all of the branch circuits. In turn, the fused branch circuits have outlet terminals arranged for connection to the respective individual electrical apparatus with each individual electrical circuit provided with its respective fusing element.

In the past these load centers, or fuse boxes as they are sometimes commonly called, have been constructed to provide a predetermined number of fused branch circuits. In some instances the installed load center was too small, or was not constructed to provide fuses for a sufficient number of branch circuits, simply because a larger number of branch circuits was not anticipated at the time the load center was installed. In such cases a second load center has to be added in parallel to the first load center to accommodate additional branch circuits with each branch circuit being fused individually. In other instances extra large load centers having many fused branch circuit connections were installed when only a few branch circuit connections were needed, thus making the load center more expensive than necessary. Also, when extra branch circuit portions are provided, a dangerous condition exists unless the user inserts fuses in all of the fuse blocks, including non-used circuits, to cover up any bare electrical conductors. It has been found that in actual practice, house owners are apt to leave the fuses out of the unused circuits, instead of inserting extra fuses for the sole purpose of safely filling the space to prevent anyone accidently getting an electrical shock.

The present invention has for one of its main objects the overcoming of the aforementioned difficulties and deficiencies encountered in prior load centers.

Another object of the present invention is to provide a load center in which additional fused branch circuits may be quickly and easily joined onto existing circuits.

Another object of the invention is to provide a load center in which all trunk and branch terminals and conductors are fully protected and covered.

Another object of the invention is to provide a load center with one circuit having a main disconnect and branch circuits having respective disconnects which may easily be joined onto the main disconnect to provide other circuits in addition to the circuit provided by the main disconnect, with each circuit thus provided protected by a fuse element.

Another object of the invention is to provide a load center in which fuse blocks for branch circuits may be plugged onto or joined to existing disconnects, or fuse blocks, to provide additional fused branch circuits in parallel with the already existing fused branch circuits.

Other objects and a fuller understanding of this invention may be had by referring to the following description and claims, taken in conjunction with the accompanying drawings in which:

The description, drawings and claims jointly set forth one or more embodiments of the present invention and the present contribution to the art of providing a load center in which fuse blocks for branch circuits may be plugged onto or joined to existing disconnects to provide additional fused branch circuits in parallel with the already existing fused branch circuits.

Figure 1:
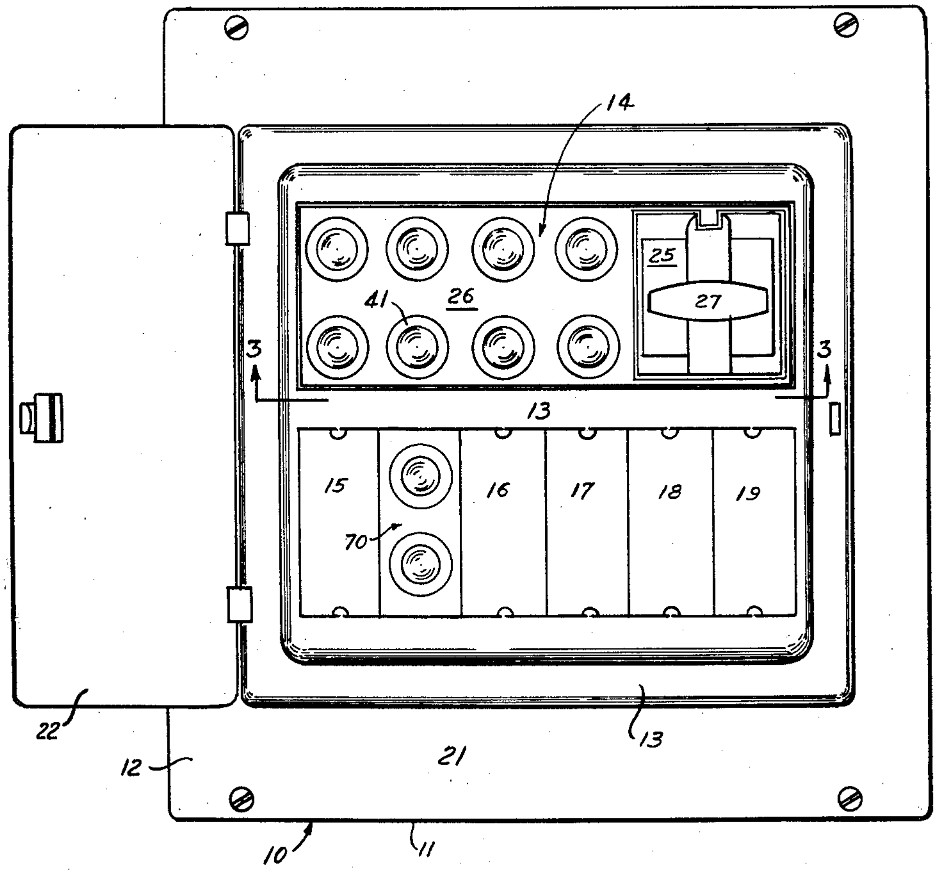
FIGURE 1 is a front view of a load center showing a fuse block for a branch circuit joined to an existing disconnect to provide an additional fused branch circuit in parallel with the already existing fused branch circuits, and further showing the cover surrounding the fuse block and the existing disconnect to completely enclose all of the terminals and electrical conductors in the load center.

The load center illustrated in FIGURE 1 is mounted within and enclosed by an enclosure 10 comprising a box 11 and a cover 12. The cover 12 has a recessed portion providing a barrier 13 which extends around a disconnect 14. The barrier 13 also has a plurality of knockouts, for example, knockouts 15, 16, 17, 18, and 19 which may be individually and separately removed from the barrier 13 to provide openings in the barrier 13. As is illustrated, the barrier 13 is recessed back from the front face 21 of the cover 12. The barrier 13 and disconnects 14 may be completely enclosed by hinging a door 22 on the cover so that the door 22 lies in the plane of the face of the cover when it is closed.

The term "disconnect" as used herein refers to electrical apparatus which will disconnect a load from the source of electrical energy in case of overloads, short circuits, etc. In one of its simplest forms, a disconnect may be a fuse block and fuse or a body of insulation material supporting a fuse and holding it in electrical conductivity with the current carrying conductors. The terms "trunk circuit" and "branch circuit" as used herein refer to the structure positioned within the enclosure which provides a portion of a complete trunk or branch circuit and do not necessarily include any load equipment energized through the fuse blocks and disconnects enclosed in the enclosure.

In this instance, the disconnect 14 is illustrated as having a pull fuse section 25 and a fuse block section 26. Pull fuse section 25 is of the well-known pull fuse type which will completely disconnect the branch circuits connected through it when it is pulled out of the load center in a direction away from the barrier 13 by means of its handle 27. Fuse block section 26 is of the well-known fuse block type which is adapted to receive screw-in type fuses, one for each branch circuit.

Figure 2:
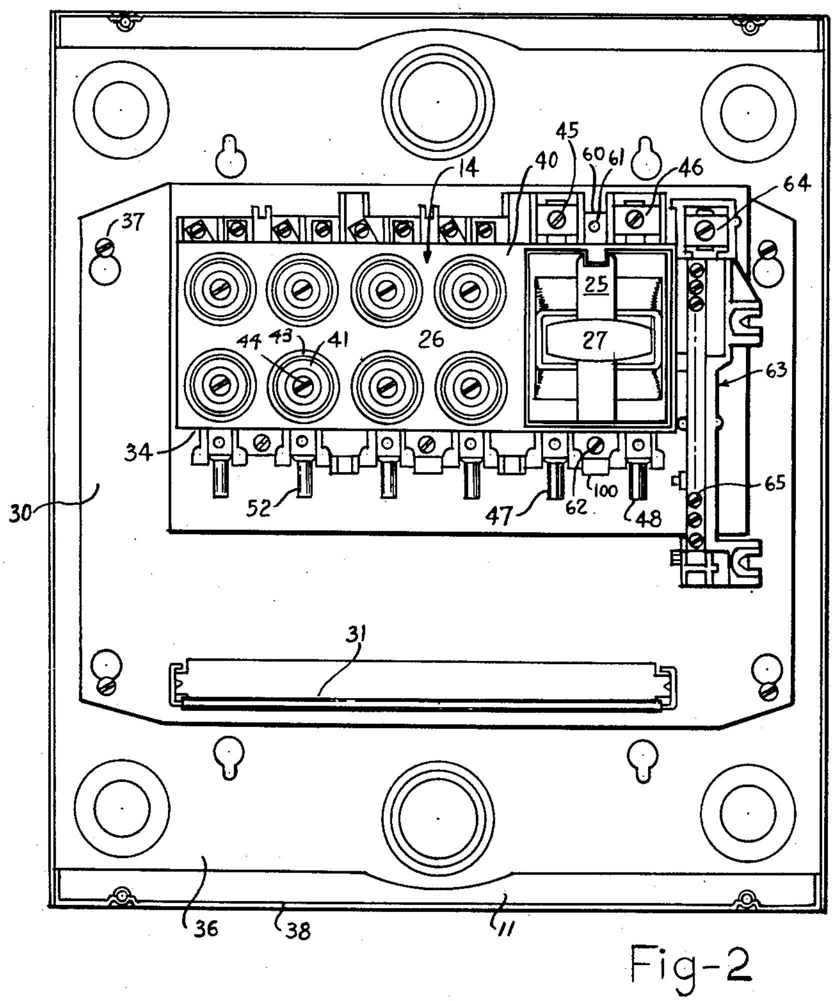
FIGURE 2 is a front view of the load center of FIGURE 1 with the cover removed to show the details of the disconnect and prior to the addition of plug-in units to provide additional fused branch circuits.

The load center is illustrated in FIGURE 2 with the cover 12 and barrier 13 removed to better illustrate the details of construction of the disconnect 14. The disconnect 14 is mounted on a unitary base plate 30 having a supporting section or a pivot 31 extending along an edge portion thereof. The disconnect 14 is spaced from pivot 31 and is provided with wall portion 34 facing pivot 31 and extending generally parallel thereto.

Base plate 30 and disconnect 14 carried thereby are mounted on the back 36 of enclosure 10 by screws 37 or other suitable means. Besides having back 36 the box has an end wall 38 extending parallel to the wall 34 and the pivot 31 with end wall 38 spaced from pivot 31 and with pivot 31 positioned between end wall 38 and wall 34.

Disconnect 14 is provided with a body 40 of insulation material and a plurality of conductors which jointly define the pull fuse section 25 and fuse block section 26. To form fuse block section 26, body 40 is provided with a plurality of fuse sockets, including fuse socket 41. Since the fuse sockets are all alike, only fuse socket 41 will be further described. Fuse socket 41 contains a screw shell or metal ring 43 and a center 44 for receiving a well-known standard screw-in fuse (not shown) in which the fuse electrically connects metal ring 43 to center 44.

Figure 5:
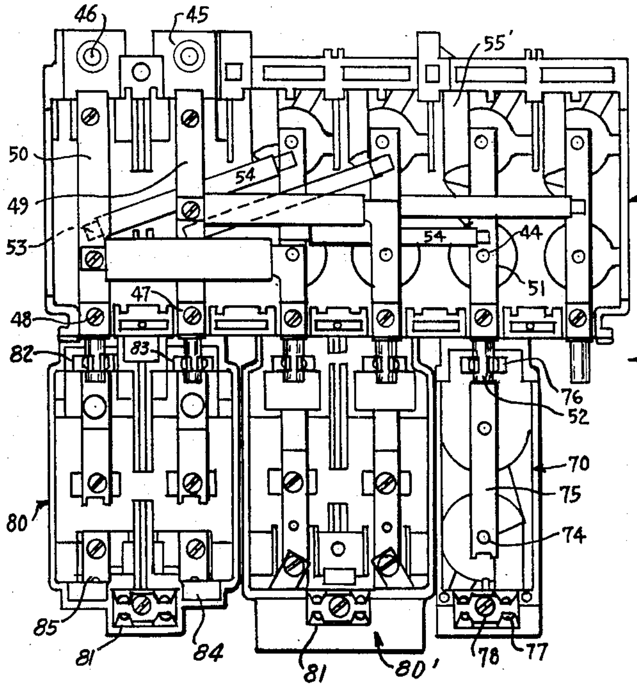
FIGURE 5 is a back view of the load center illustrated in FIGURE 4, with the box removed, to better illustrate the position of the electrical circuit conductors.

Pull fuse section 25 is provided with trunk line terminals 45 and 46 on one side thereof and trunk line connection terminals 47 and 48 on the other side thereof, the terminals 47 and 48 extending outwardly through the wall 34. Terminals 45 and 46 are connected to terminals 47 and 48 respectively by bus bars 49 and 50 (see FIG. 5) which extend through the lower portion of the body 40. The terminals 47 and 48 thus permit the addition of another heavy duty or trunk type main disconnect or pull fuse section which may be easily joined to the already existing main disconnect or pull fuse section 25.

Center 44 on the fuse socket 41 is electrically connected to a bus bar 51, which extends outwardly through wall 34 and forms a connection terminal 52 spaced from connection terminals 47 and 48 and pivot 31 and extending toward pivot 31. Bus bar 51 in turn is connected by bus bars 54 to a terminal 53 carried by body 40. The terminal 53 is positioned between trunk line terminal 46 and connection terminal 48 and is adapted to be engaged by one end of a fuse carried by pull fuse section 25 so that a fuse in pull fuse section 25 connects trunk line terminal 46 and terminal 53 together electrically. In this way, when pull fuse section 25 is removed from body 40 no current can flow from trunk line terminal 46 to center 44 and connection terminal 52.

Body 40 also supports a plurality of branch circuit terminals, one for each metal ring, and including branch circuit terminal 55, which is connected to its respective metal ring 43 by a bus bar 55' in the manner commonly used in the fuse block industry so that current is available at branch circuit terminal 55 when pull fuse section 25 is plugged in and when a fuse (not shown) is inserted in fuse socket 41.

Disconnect 14 may be bolted, screwed or otherwise fastened to base plate 30. In this instance, base plate 30 is provided with one or more ears 60 engageable with an ear-receiving opening 61 in body 40 and one or more cooperative space screws 62, which extend through a portion of body 40 and into base plate 30. Also mounted on base plate 30 is a neutral or ground terminal 63 which is provided at one end thereof with a trunk ground clamp 64 and a plurality of branch ground clamps 65 each adapted to receive its respective one of the branch ground wires (not illustrated).

After the load center including the enclosure 10 and disconnect 14 has been installed in an electrical circuit to provide trunk circuit fuses and branch circuit fuses for as many different trunk and branch circuits as there are pull fuse sections 25 and fuse sockets 41, it is still easy to quickly provide additional fused circuits. To provide additional circuits one or more of the knockouts, such for example knockout 15, is removed from the barrier 13. A disconnect, for example fuse block 70, is attached to the pivot 31 and the respective connection terminal 52 and extends at least partially through and completely fills the opening formed by removing the knockout.

Figure 6:
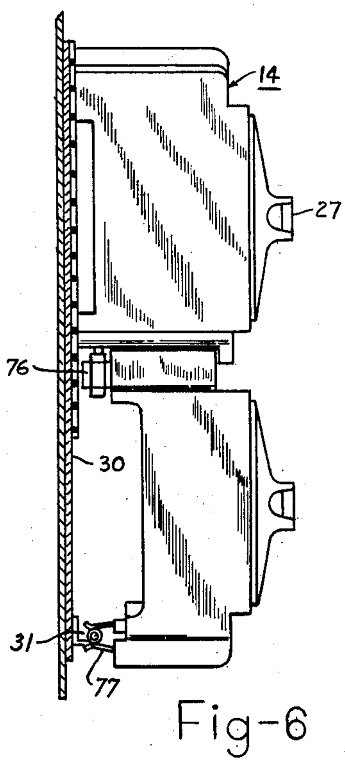
FIGURE 6 is a sectional view taken along the line 6—6 of FIGURE 4.

The fuse block 70 comprises a body of insulation material supporting one or more sockets, for example socket 71, which is adapted to receive a screw-in type fuse in the same manner as the socket 41. Socket 71 is lined with a metal screw shell or ring 73 and has a center 74 adapted to be electrically interconnected by a fuse screwed therein. Center 74 is connected to a bus bar 75 which terminates in a spring clip 76 disposed at one end of the block 70 for engagement with connection terminal 52. Good current conductivity between the parts and a mechanical support of the fuse block 70 are obtained by making connection terminal 52 cylindrical in shape and by providing spring clip 76 with spring fingers which slip over and grip onto connection terminal 52. Pivot attaching means, for example a clip 77 is carried by the opposite end of fuse block 70 and is electrically isolated from all current conductive parts of the fuse block. In this instance, clip 77 has been constructed in the form of a modified U-shaped clip (see FIG. 6) having fingers for resiliently engaging pivot 31 with the clip being secured to the body of insulation material by a screw 78.

In order to fasten the additional branch circuit to the metal ring 73, a branch circuit terminal 79 is electrically connected to ring 73 and is preferably positioned in the same end of fuse block 70 as the pivot attaching clip 77.

To install the branch circuit fuse block 70, the clip 77 is first clipped or otherwise engaged with pivot 31 and the block 70 then pivoted until spring clip 76 conductively and securely engages connection terminal 52. Following this one of the wires for an additional branch circuit is easily secured to terminal 79 and the other of the wires for that branch circuit is secured in branch ground clamp 65.

It is particularly noted that the barrier 13 extends around the upper portion of the insulation body fuse block 70 to completely protect all of the bus bars and electrical connections after the branch circuit has been added in the same manner as it did before the branch circuit was added.

In some instances it is necessary to add a branch pull fuse section in parallel with the already existing pull fuse section 25. A branch pull fuse section 80 may easily be added in generally the same manner in which a branch fuse block is added. Generally however, the pull fuse sections are designed to carry much heavier loads demanding higher currents and voltages than the fuse blocks. For this reason the additional pull fuse section 80 is usually the same size as the existing pull fuse section 25 and has one or more pivot attaching clips 81 on one end thereof and a pair of spaced inlet clips or terminals 82 and 83 on the other end thereof. As illustrated pull fuse section 80 is inserted in the same manner as fuse block 70 with the exception that its inlet terminals 82 and 83 engage trunk line connection terminals 47 and 48 respectively, whereas fuse block 70 in this instance only engages one connection terminal. Fuse section 80 has outlet terminals 84 and 85.

Figure 4:
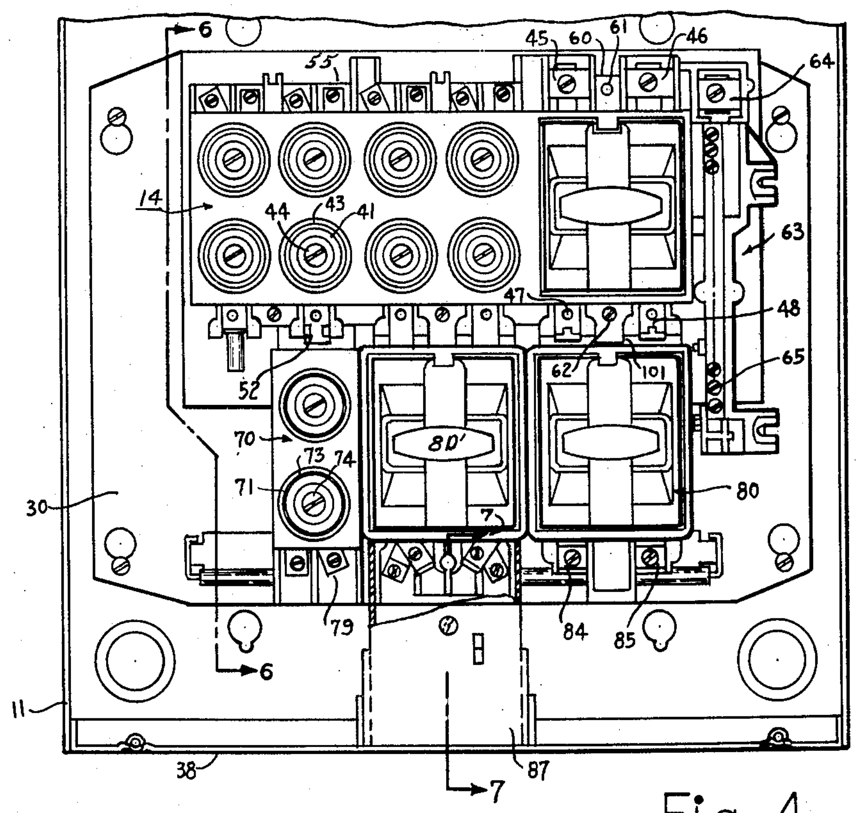
FIGURE 4 is a front view of the load center of FIGURE 1 with several plug-in units joined to existing disconnects to provide additional fused branch circuits.
Figure 7:
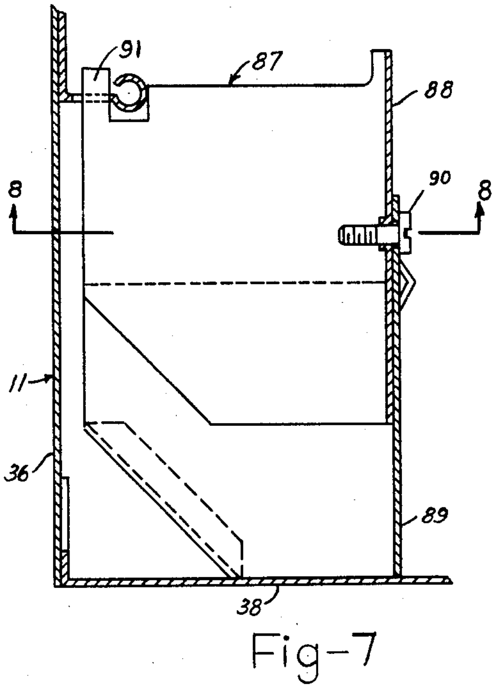
FIGURE 7 is a sectional view taken along the line 7—7 of FIGURE 4.
Figure 8:
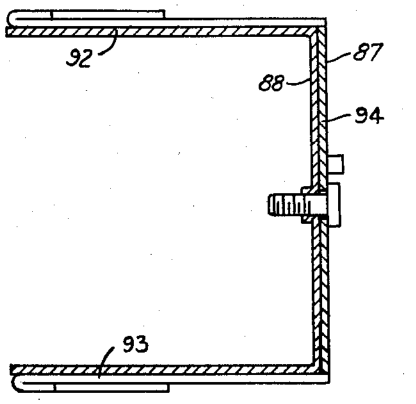
FIGURE 8 is a sectional view taken along the line 8—8 of FIGURE 7.

In those instances wherein the circuit wires from the outlet terminals 84 and 85 of any of the pull fuse sections, for example section 80', have to be more fully protected, a channel shaped housing 87 may be positioned between the pull fuse section and the end wall 38 of enclosure 10. Referring to FIGURES 4, 7 and 8, it is noted that this somewhat channel shaped housing 87 is formed of two parts 88 and 89 which telescope endwise and are secured together by a screw 90. The housing part 88 is provided with hook portions, for example hook portion 91, in the side walls 92 and 93 and near the edges thereof closest to back 36 and furthest from the top wall 94 which interconnects the side walls 92 and 93. These hooks 91 engage pivot 31 so that housing part 88 fits tightly against the pull fuse section. The screw holes through which screw 90 extends are so positioned that the opposite end of channel shaped housing 87 or one end of housing part 89 engages end wall 38.

As previously mentioned the pull fuse sections 80 and 80′ are used for branch circuits requiring higher voltages and currents than the fuse blocks 70 are designed to safely handle. For this reason features have been incorporated in the fuse block 70, the pull fuse section 80 and the wall 34 of disconnect 14 to insure correct placement of the pull fuse sections and the fuse blocks. More specifically the parts have been designed so that it is impossible to put a fuse block, such as fuse block 70, in the space reserved for the larger heavy duty pull fuse section. At the same time, and in the embodiment illustrated in the accompanying drawings, it is possible to use a pull fuse section in place of two adjacent fuse blocks.

Figure 3:
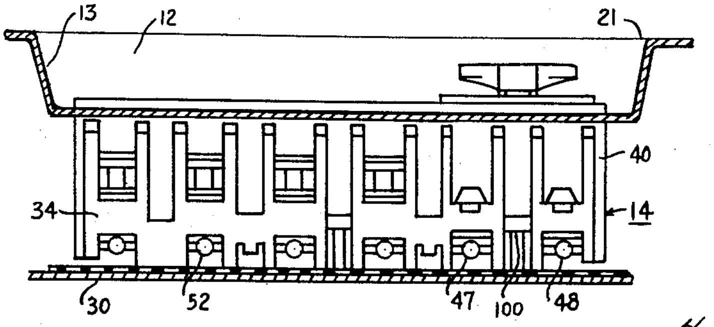
FIGURE 3 is a sectional view taken along the line 3—3 of FIGURE 1.

As illustrated in FIGURES 2 and 3, the connection terminals, for example terminals 47, 48 and 52, which extend outwardly from wall 34 are each equally spaced from its respective next adjacent terminal, and are disposed in a single plane parallel with and spaced from the base plate 30. Extending outwardly from the wall and between adjacent trunk line connection terminals, for example terminals 47 and 48, is a projection 100 which is integrally molded with the remainder of the wall 14 and which terminates short of the free ends of the trunk line connection terminals 47 and 48. Pull fuse section 80 has a recess 101, shown in FIG. 4, in the end thereof and disposed between inlet terminals 82 and 83 for receiving this projection 100 so that the inlet terminals 82 and 83 will engage trunk line connection terminals 47 and 48 when the pull fuse section 80 is plugged thereon. To prevent the attaching of one of the fuse blocks 70 on any of the trunk line connection terminals, including terminals 47 and 48, the end of the fuse block 70 supporting spring clip 76 is sufficiently wide and large so that it will engage projection 100 and not allow spring clip 76 to be attached to any one of the trunk line connection terminals. It is noted however that since the trunk line connection terminals and the fuse block connection terminals are all spaced equal distance from their next adjacent terminals, a pull fuse section may be clipped onto any two adjacent connection terminals, whether they are trunk line terminals, fuse block terminals or a mixture of trunk line and fuse block terminals.

It is apparent from the foregoing description and the accompanying drawings that the present load center provides for the attaching of supplementary or additional disconnects onto already existing disconnects. Provision is made to prevent the fastening of a disconnect capable of handling current and voltage of a low magnitude onto an existing disconnect capable of handling current and voltage of a high magnitude. In this instance the spacing of the terminals also permits the adding or fastening of an additional disconnect capable of handling current and voltage of a high magnitude onto an already existing disconnect which is incapable of handling current and voltage above low magnitude. These features coupled with the complete enclosing or covering of all conductors and wires provides an exceedingly safe load center which is readily adaptable to many construction jobs and which meets all of the objects set forth by overcoming the problems and deficiencies of prior load centers.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A load center comprising a unitary baseplate, a supporting section adjacent an edge portion of said baseplate, first independently operable disconnect means carried by said baseplate and spaced from said supporting section, said first disconnect means including a body of insulation material and at least one connection terminal secured to said body of insulation material independently of said baseplate and extending outwardly from said body of insulation material towards said supporting section, second independently operable disconnect means having opposite ends, attaching means on one end of said second disconnect means attaching said second disconnect means to said supporting section, an inlet terminal on the other end of said second disconnect means and spaced from said attaching means a distance substantially equal to the distance between said connection terminal and said supporting section and electrically engaging said connection terminal, and a current conductive outlet terminal on said second disconnect means.

2. The structure of claim 1 wherein said inlet terminal defines a spring clip springingly engageable with said connection terminal when said attaching means is attached to the said supporting section to thereby cause said supporting section and connection terminal to cooperatively support said second disconnect means.

3. A load center comprising a baseplate, a pivot extending along an edge portion of said baseplate, first electrical disconnect means mounted on said baseplate and spaced a predetermined distance from said pivot, said first disconnect means including a body of insulation material, a plurality of spaced connection terminals carried by said body of insulation material independently of said baseplate and extending outwardly from said body of insulation material towards said pivot, a plurality of individual second disconnect means, each having a block of insulation material, pivot attaching means, one on one end of each said block, attaching each said block to said pivot independently of any other second disconnect means, inlet terminals, one on the other end of each said block and spaced from the pivot attaching means on the same block a distance substantially equal to the distance between its respective one of said connection terminals and said pivot, and electrically engaging its respective one of said connection terminals, and a plurality of current conductive outlet terminals, at least one carried by each of said blocks.

4. The structure of claim 3 wherein each said inlet terminal defines a spring clip springingly engageable with its respective of said connection terminals when the respective one of said attaching means is attached to the said pivot to thereby cause said pivot and the respective connection terminal to cooperatively support said block independently of any other of the plurality of individual second disconnect means.

5. A load center comprising a unitary baseplate, a pivot extending along an edge portion of said baseplate, electrical disconnect means mounted on said baseplate and spaced a predetermined distance from said pivot, said disconnect means including a body of insulation material and first conductor means adapted to be connected to a source of power and a plurality of spaced connection terminals carried by said body of insulation material independently of said baseplate and extending outwardly from said body of insulation material towards said pivot means, means electrically connecting said connection terminals to said first conductor means, a block of insulation material having opposite ends, pivot attaching means on one end of said block attaching said block to said pivot, an inlet terminal on the other end of said block and spaced from said pivot attaching means a distance substantially equal to the distance between its respective one of said connection terminals and said pivot and electrically engaging one of said connection terminals, an outlet terminal carried by said block, said inlet terminal defining a spring clip springingly engageable with its respective of said connection terminals when said attaching means is attached to the said pivot to thereby cause said pivot and connection terminal to cooperatively support said block.

6. A load center comprising a baseplate, a supporting section adjacent an edge portion of said baseplate, a plurality of first disconnect means carried by said baseplate and spaced from said supporting section, one of said first disconnect means being incapable of handling voltage and current of a magnitude above a low magnitude and another of said first disconnect means being capable of handling voltage and current of a considerably higher magnitude, each of said first disconnect means including insulation material and at least one connection terminal extending outwardly from said insulation material and said first disconnect means towards said supporting section, a plurality of second disconnect means, each having opposite ends, one of said second disconnect means being capable of handling voltage and current of the said one magnitude and another of said second disconnect means being capable of handling voltage and current of said higher magnitude, attaching means, one for each second disconnect means, on its respective one end of each said second disconnect means attaching that second disconnect means to said supporting section, inlet terminals, at least one for each second disconnect means, on its respective other end of each said second disconnect means and spaced from its respective attaching means a distance substantially equal to the distance between its respective connection terminal and the said supporting section and electrically engaging its respective connection terminal, current conductive outlet terminals, at least one on each said second disconnect means, each of said first and each of said second disconnect means having cooperative means to prevent the engagement of the inlet terminal on a second disconnect means incapable of handling voltage and current of a magnitude above said low magnitude with the connection terminal of any first disconnect means capable of handling voltage and current of said higher magnitude.

7. The structure as defined in claim 6 wherein the insulation material of all of said first disconnect means is integrally joined into a single body of insulation material.

8. The structure as defined in claim 6 wherein said cooperating means includes projections on said first disconnect means extending outwardly thereof and disposed between at least some of said connection terminals capable of handling currents and voltages of said high magnitude and said one end of said second disconnect means incapable of handling currents and voltages above said low magnitude has portions to interfere with said projections.

9. The structure as defined in claim 7 including a projection extending outwardly from said body next adjacent the connection terminal of the first disconnect means capable of handling current and voltage of high magnitude and said second disconnect means capable of handling currents and voltages of high magnitude has a recess in the said one end thereof for receiving said projection.

10. The structure as defined in claim 6 wherein any of the said second disconnect means capable of handling currents and voltages of high magnitude are engageable with any of the connection terminals on all of the first disconnect means, and wherein any of the said second disconnect means incapable of handling currents and voltages of a magnitude above a low magnitude are not engageable with any of the connection terminals on the first disconnect means capable of handling currents and voltages of high magnitude.

11. A load center comprising a baseplate, a supporting section adjacent one edge portion of said baseplate, first disconnect means carried by said baseplate and spaced from said supporting section, said first disconnect means including a body of insulation material and at least one connection terminal extending outwardly from said body of insulation material towards said supporting section, second disconnect means having opposite ends, attaching means on one end of said second disconnect means attaching said second disconnect means to said supporting section, an inlet terminal on the other end of said second disconnect means and spaced from said attaching means a distance substantially equal to the distance between said connection terminal and said supporting section and electrically engaging said connection terminal, a current conductive outlet terminal on said second disconnect means, and housing means provided with hook means on one end thereof engaging said supporting member, said housing means engaging said one end of said second disconnect means and cooperating therewith to enclose said current conductive outlet terminal.

12. A load center comprising a baseplate, a pivot extending along an edge portion of said baseplate, first electrical disconnect means carried by said baseplate and spaced from said pivot, said first disconnect means including a body of insulation material, a plurality of spaced connection terminals extending outwardly from said body of insulation material towards said pivot, a plurality of individual second disconnect means, each having a block of insulation material, pivot attaching means, one on one end of each said block attaching each said block to said pivot independently of any other second disconnect means, inlet terminals, one on the other end of each said block and spaced from the pivot attaching means on the same block a distance substantially equal to the distance between its respective one of said connection terminals and said pivot and electrically engaging its respective one of said connection terminals, a plurality of current conductive outlet terminals, at least one carried by each of said blocks, a channel shaped housing having one end thereof closed by one of said blocks of insulation material, and an enclosure including a back and end wall for enclosing said baseplate and said first and second disconnect means and said housing, said end wall engaging and closing the opposite end of said housing.

13. A load center comprising a baseplate, a pivot extending along an edge portion of said baseplate, first electrical disconnect means carried by said baseplate and spaced from said pivot, said first disconnect means including a body of insulation material, a plurality of spaced connection terminals extending outwardly from said body of insulation material towards said pivot, a plurality of individual second disconnect means, each having a block of insulation material, pivot attaching means, one on one end of each said block attaching each said block to said pivot independently of any other second disconnect means, inlet terminals, one on the other end of each said block and spaced from the pivot attaching means on the same block a distance substantially equal to the distance between its respective one of said connection terminals and said pivot and electrically engaging its respective one of said connection terminals, a plurality of current conductive outlet terminals, at least one carried by each of said blocks, a channel shaped housing having one end thereof closed by one of said blocks of insulation material, said channel shaped housing being formed of two parts telescoped together, fastening means engaging said parts and fastening them together, and an enclosure including a back and end wall for enclosing said baseplate and said first and second disconnect means and said housing, said end wall engaging and closing the opposite end of said housing.

14. In an electrical panelboard, in combination, a base, supporting means carried by said base, first circuit interrupting means carried by said base, said first circuit interrupting means comprising a portion fabricated of insulating material and a plurality of discrete spaced-apart electrical terminal means rigidly supported by said insulating material independently of said base and spaced apart from said supporting means, each of said electrical terminal means having a predetermined electrical rating, means supported on said insulating material adjacent each terminal means and having a configuration determined in accordance with the electrical rating of a respective electrical terminal means, a plurality of second circuit interrupting means for attachment to said base and to said first circuit interrupting means in supporting relationship, each one of said second circuit interrupting means being provided with means mechanically attached to said supporting means and being further provided with energizable means mechanically and electrically attached to one of said electrical terminal means of said first circuit interrupting means, and means provided on each of said second circuit interrupting means adjacent its respective energizable means and having a configuration determined in accordance with the electrical rating of that respective second circuit interrupting means whereby its said energizable means can only be associated with certain of said electrical terminal means of said first circuit interrupting means.

References Cited in the file of this patent

UNITED STATES PATENTS

| | | |
|---|---|---|
| 1,642,698 | Rohn | Sept. 20, 1927 |
| 1,700,757 | Benjamin | Feb. 5, 1929 |
| 2,007,174 | Benjamin | July 9, 1935 |
| 2,072,730 | Corbett | Mar. 2, 1937 |
| 2,074,862 | Sachs | Mar. 23, 1937 |
| 2,186,813 | Adam et al. | Jan. 9, 1940 |
| 2,626,984 | Cole | Jan. 27, 1953 |
| 2,767,353 | Kingdon | Oct. 16, 1956 |
| 2,831,944 | Miller | Apr. 22, 1958 |
| 2,848,581 | Oskosh et al. | Aug. 19, 1958 |
| 2,902,632 | Standback et al. | Sept. 1, 1959 |
| 2,905,796 | Fleming | Sept. 22, 1959 |
| 2,910,629 | Casey | Oct. 27, 1959 |
| 2,961,512 | Standback et al. | Nov. 22, 1960 |

UNITED STATES PATENT OFFICE

CERTIFICATE OF CORRECTION

Patent No. 3,070,679 December 25, 1962

Harris I. Stanback

It is hereby certified that error appears in the above numbered patent requiring correction and that the said Letters Patent should read as corrected below.

Column 6, line 47, after "respective" insert -- one --; line 71, before "an" insert -- and --; line 74, before "of" insert -- one --; column 7, line 17, for "capable" read -- incapable --; same line 17, for "of", second occurrence, read -- above --; line 18, for "one" read -- low --; same column 7, line 30, before "current" insert -- and --.

Signed and sealed this 16th day of July 1963.

(SEAL)
Attest:

ERNEST W. SWIDER
Attesting Officer

DAVID L. LADD
Commissioner of Patents